United States Patent [19]

Becker et al.

[11] Patent Number: 5,728,019
[45] Date of Patent: Mar. 17, 1998

[54] BELT DRIVE

[75] Inventors: Harald Becker, Oberhausen, Germany;
Piotr Dudzinski, Wroclaw, Poland;
Michael Ketting, Enneppetal, Germany

[73] Assignee: Intertractor Aktiengesellschaft, Gevelsberg, Germany

[21] Appl. No.: 607,527

[22] Filed: Feb. 27, 1996

[30] Foreign Application Priority Data

Feb. 28, 1995 [DE] Germany ................ 195 06 939.0

[51] Int. Cl.⁶ ........................ F16D 3/02; F16H 55/00; F16H 55/32

[52] U.S. Cl. ............... 474/94; 474/152; 474/159; 474/163; 474/166; 474/171; 474/273; 474/902; 198/834

[58] Field of Search ........................... 474/100, 109, 474/112, 149, 94, 101, 102, 106, 107, 166, 171, 174, 158, 159, 162, 163; 180/350, 351, 357, 366, 373; 198/834

[56] References Cited

U.S. PATENT DOCUMENTS 5,061,224  10/1991  Stuhler .................. 474/84

*Primary Examiner*—Tamara L. Graysay
*Assistant Examiner*—Gary S. Hartmann
*Attorney, Agent, or Firm*—Herbert Dubno

[57] ABSTRACT

A drive system, especially a belt drive for a multi-axial vehicle running gear, has a drive drum about which the belt is looped and provided with a ring with entrainers which engage teeth on the belt when there is slip between the belt and the drum. Limited rotation of the ring relative to the drum may be effected by elliptical spring elements coupling the ring and the drum or by clutches on the drum which frequently lock the ring to the drum so as to effect control engagement of the entrainers with the belt teeth and positive drive of the belt by the drum.

9 Claims, 8 Drawing Sheets

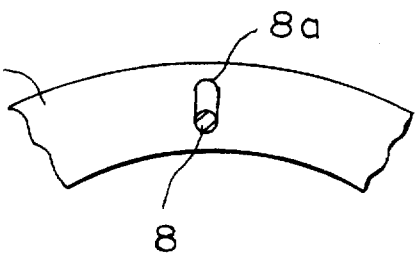
FIG. 2A
FIG. 2
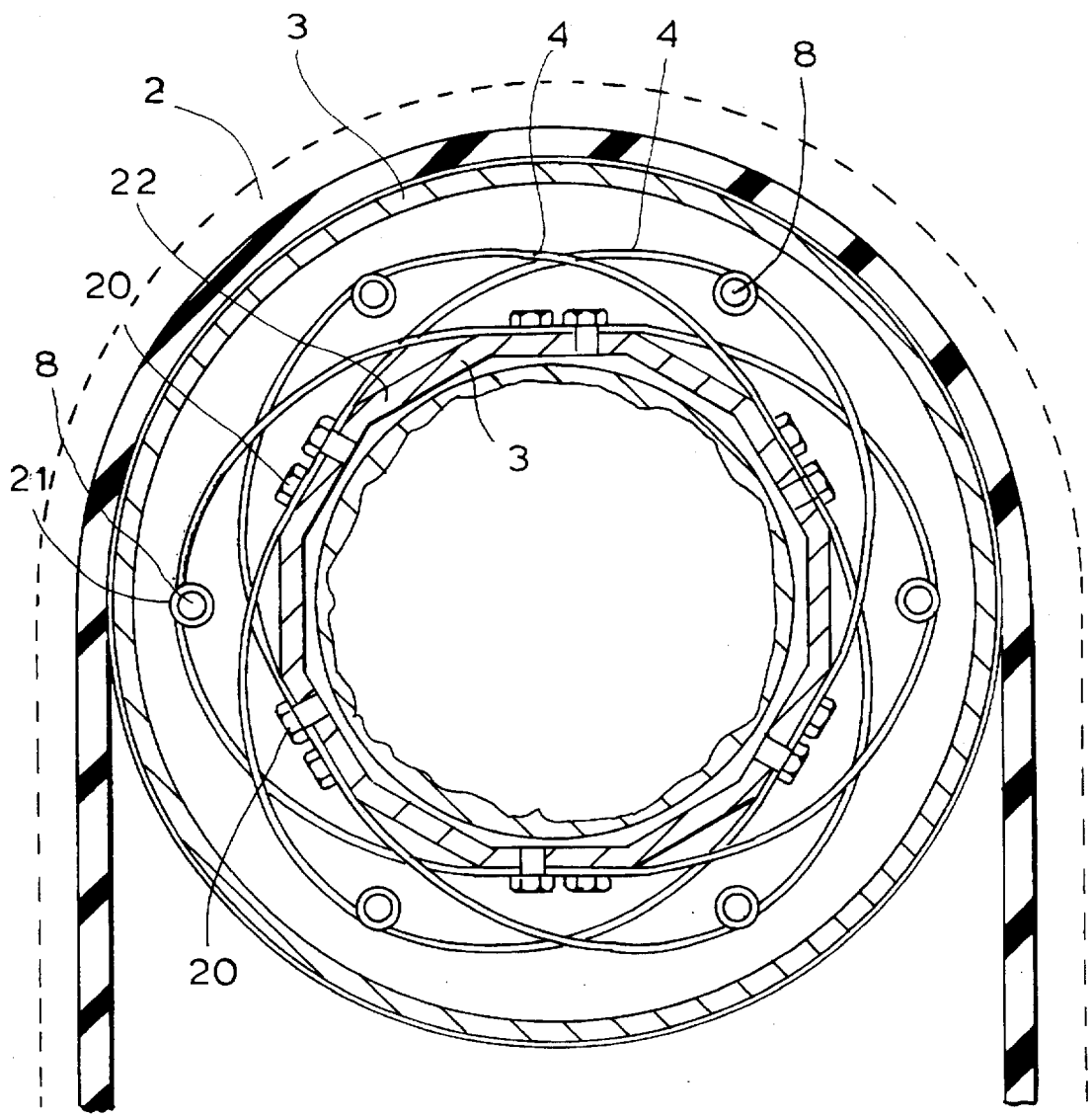

F I G. 3
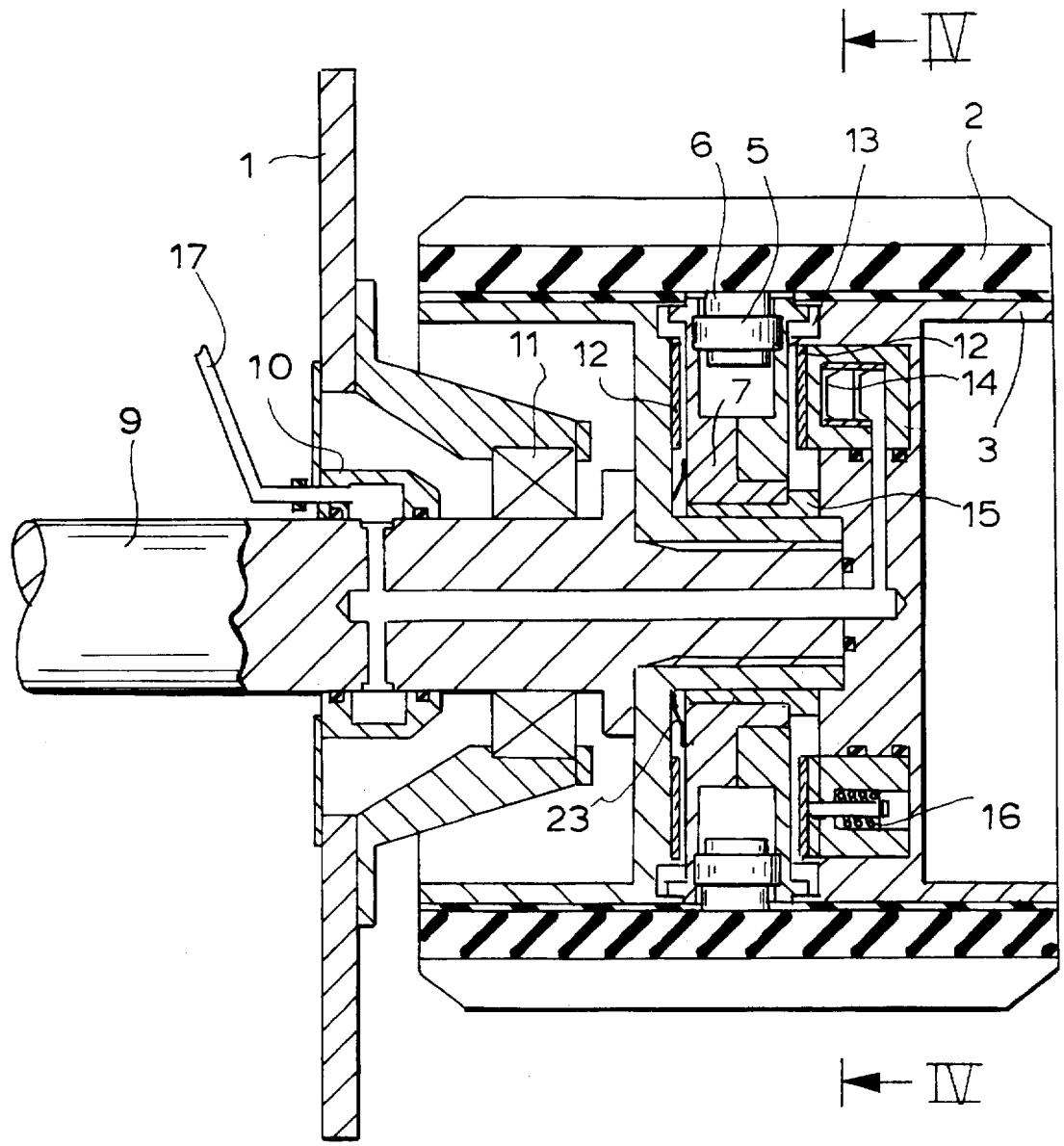

BELT DRIVE

FIELD OF THE INVENTION

Our present invention relates to a belt drive and especially to a multi-axle running gear for vehicles utilizing endless belts whereby each belt passes around a drive drum and at least one deflection or reversing drum, the belt being usually an elastomeric belt serving in part as a traction transfer element in frictional engagement with the drive drum.

The invention in particular relates to drives of this type in which the belt is toothed and the drum can have entrainers which engage the teeth of the belt.

BACKGROUND OF THE INVENTION

A belt drive system in which the belt path frictionally engages a drum and has teeth which are engaged by entrainers on the drum, is known, for example, from DE 90 06 701 U1. The belt is looped around the drive drum and the return drum or a plurality of deflection drums and is an endless elastomeric member. In normal operation, the traction is frictionally transferred between the drive and the belt in a reliable manner. Nevertheless teeth are provided along the inner side of the belt to cooperate with teeth on the drum. When a material capable of reducing the friction coupling between the belt and the drum lodges between them, a positive drive results because the teeth of the belt are engaged by the entrainers affixed to the drum or the teeth playing that role on the drum. Such drives may have lateral support flanks for guiding the sides of the belt and tension can be applied by a tension device acting on the belt or on the drum. Such tensioning devices may also be used in the system of the invention.

A drawback with this earlier system, however, is that, when slip develops between the belt and the drive drum, the engagement of the teeth of the belt with the entrainer takes place with an impact or shock which can result in breakage of the teeth or the entrainers and frequently with significant and uncontrolled wear of both.

OBJECTS OF THE INVENTION

It is, therefore, the principal object of the present invention to provide an improved drive system for the purposes described which can soften the engagement of the teeth with the entrainers or visa versa or reduce the impact and wear in the transition between the friction drive and the positive drive of the belt.

Another object of the invention is to provide a drive system, especially for a multi-axial traveling gear of an automotive vehicle, whereby drawbacks of earlier systems are obviated and particularly wear and the danger of breakage are reduced.

It is also an object of the invention to provide an improved belt drive system which allows an automatic or operator-controlled transition between friction drive and positive drive which eliminates the disadvantages discussed above.

SUMMARY OF THE INVENTION

These objects and others which will become apparent hereinafter are attained, in accordance with the invention, in a drive system especially for a multi-axial running gear for a automotive vehicle having belts and especially elastomer belts passing around a drum drive and looped around at least one deflection drum and where the belt has teeth for engagement by entrainers of the drum.

According to one aspect of the invention, a ring is journaled on the drum and has the entrainers, the ring being relatively rotatable with respect to the drum with the rotation being limited by spring elements which allow a cushioned engagement of the entrainers with the teeth of the belt.

In another aspect of the invention, the ring is provided and a clutch has a coupling disk on the drum which can be pressed laterally against the ring to afford a controlled engagement of the entrainers with the teeth.

In either case, the belt drive of the invention can comprise:

- a belt having an inner surface and a row of inwardly projecting teeth extending along the surface;
- a drive drum around which the belt extends and having an outer periphery frictionally engaged by the surface for frictional drive of the belt by the drum;
- a ring on the drum rotatable relative to the drum and formed with entrainer engageable by the teeth; and
- means between the drum and the ring for impeding displacement of the ring relative to the drum upon slip of the surface of the belt on the drum to effect controlled engagement of the entrainers with the teeth and positive drive of the belt by the drum.

In the first case, the drum includes spring elements limiting rotation of the ring relative to the drum and stressed upon relative rotation of the ring and the drum. The springs effect resilient engagement of the entrainers and the teeth for positive drive of the belt by the drum.

The spring elements can be affixed to the drum and to the ring. The ring can be journaled in an inner chamber of the drum which can have a circumferential slot through which the teeth engage, the entrainers being disposed behind the teeth and the spring elements having generally elliptical curvatures. The ring can have radial slots with each of the pins being radially guided therein.

In this embodiment, with an increasing angle of the relative angular displacement of the ring with respect to the drum, an increasing spring force is generated which resists the impact of the entrainers with the teeth. Since the entrainers of the ring engage the teeth of the belt with a maximum of 180° angular offset of the ring with respect to the drum, the relief of the stressed spring when engagement of the teeth is no longer required, can restore the original angular position of the drum and the ring with the entrainers disengaged from the teeth so that the friction drive of the belt rather than positive entrainment is ensured. In the next case in which slip occurs, the damped or cushioned engagement of the entrainers with the teeth is repeated.

In a second embodiment, the means between the drum and the ring for impeding displacement of the ring relative to the drum upon slip of the surface of the belt on the drum to effect controlled engagement of the entrainers with the teeth and positive drive of the belt by the drum includes a clutch actuatable to couple the ring to the drum for joint rotation of the ring and the drum.

The clutch can be actuated to couple the ring to the drum automatically as soon as slip occurs between the belt and the drive drum, or through actuation of a clutch control by an operator. Since the clutch is applied frictionally, there is a soft engagement of the entrainers with the teeth in this embodiment. If slip of the belt is no longer a problem, the clutch can be disengaged to allow free running of the ring and preclude wear of the positive drive elements as long as the proper frictional engagement of the belt with the drum is ensured.

BRIEF DESCRIPTION OF THE DRAWING

The above and other objects, features, and advantages will become more readily apparent from the following description, reference being made to the accompanying drawing in which:

FIG. 2 is a section taken along the line II—II of FIG. 1;

FIG. 2A is a detail view showing a slot in the ring of FIG. 2;

FIG. 3 is a cross sectional view similar to FIG. 1 illustrating the second embodiment of the invention;

SPECIFIC DESCRIPTION

Figure 1:
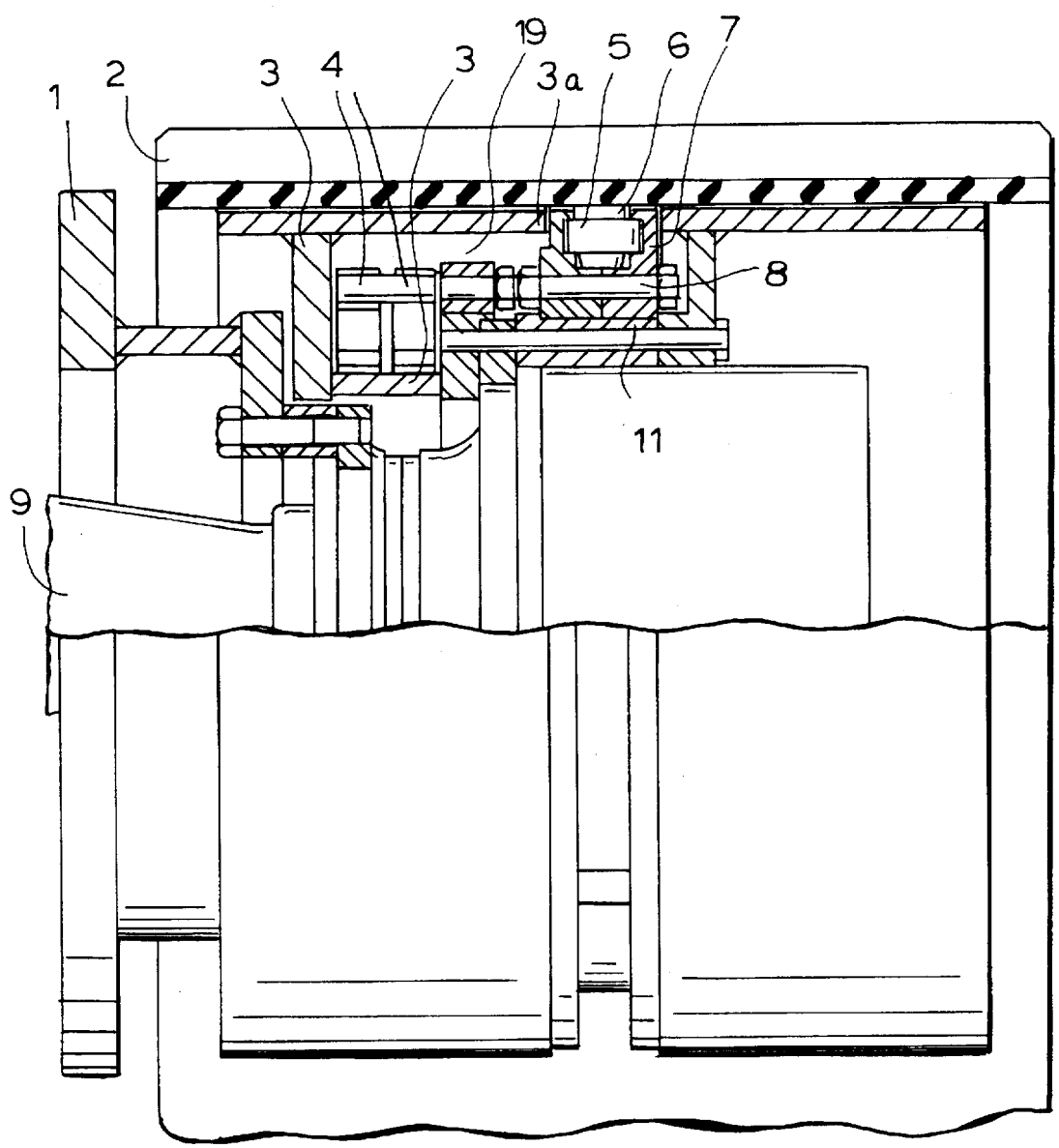
FIG. 1 is a partial cross section of a drive system of the invention utilizing spring elements.

In the drawing we have shown only part of a drive system which can, for example, be a multi-axle running gear for an earth-moving vehicle, agricultural vehicle or the like. In FIGS. 1 and 2, for example, we have shown at 1 a portion of the vehicle chassis on which a drive drum 3 is journaled and which can be driven in turn by a shaft or hydrostatic drive represented at 9. Throughout the drawing similar reference characters are used to represent identical or similarly functioning elements.

A belt 2, generally an elastomeric belt, is looped around the drive drum 3 and is frictionally engaged by the latter. To this end, the drive drum 3 may have external lining also of elastomeric material.

The drive drum 3 is provided with a ring 7 which is formed with entrainers 5 which, in the illustrated embodiments, are pins extending parallel to the axis of rotation of the drum 1, but which may, if desired, be teeth or the like.

The ring 7 is journaled for rotation relative to the drum 3 and can be mounted in a circumferential slot 3a thereof, so that teeth 6 of the inner side of the belt 2 can extend into the ring 7 and be engaged by the entrainers 5. As is especially apparent from FIG. 2, rotation of the ring 7 is limited with respect to the drum 3 by means of spring elements 4 in both directions of relative rotation of the drum and ring. Normally, i.e. when there is no slip between the belt 2 and the drum 3, the teeth 6 are not engaged by the entrainers 5 and no force is transmitted between them. When, however, slip occurs between the drum 3 and the belt 2, the ring 7 rotates against the force of the spring elements 4 relative to the drum 3, thereby increasing the restoring force on the spring and cushioning ultimate impact between the entrainers 5 and the teeth 6, which come into engagement for a positive entrainment of the belt by the drum.

The spring elements 4 are fixed at an end face of the drum at which the drive shaft 9 is flanged to it or otherwise attached to the drum. In the embodiment of FIGS. 1 and 2, moreover, the ring 7 is journaled in a radial inner chamber 19 of the drum, the bearing for the ring 7 being represented at 11. The chamber 19 also receives, in a stepped portion of the annular surface of the drum 3, the spring elements 4 which are in the form of a semi-elliptical or fully elliptical spring with ends affixed by screws 20 (FIG. 2) to the drum 3. The spring elements 4 are formed midway along their lengths with eyes 21 engaged by bolts or pins 8 extending parallel to the drum axis.

The pins 8 may lie at fixed radial distances from the drum axis or can be guided in slots 8a (FIG. 2A) so as to have some radial movement and thus allow relaxation of the springs 4 when the ring 7 is not rotated relative to the drum, i.e. when normal friction force is applied between the drum and the belt. The pins 8 are radially spaced from the periphery 22 of the drum to which they are affixed. With this configuration, decreasing frictional engagement between the belt 2 and the drum 3 and engagement of the teeth 6 by the entrainers 5, a relative displacement of the ring 7 and the drum 3 is effected with the spring elements 4 being increasingly stressed, depending upon the direction of the drum rotation so that the positive engagement of the drum with the belt is of a resilient yieldable nature. The drum here slips until the entrainers of the ring engage the teeth 6 of the belt and the latter is positively driven. When full friction is restored and all of the torque and the drive is frictionally transmitted to the belt, the torque increment in the opposite sense contributed by the stressed springs allows the ring and its entrainers to set back as the springs relax.

In the embodiment of FIGS. 3–8, a basically similar construction is used wherein the bridge between the ring 7 and the drum 3 is not, however, effected by spring elements 4 and pins 8, which are not present, but rather through a clutch system. Power is transmitted from the shaft 9 to the drum 3 and thence by friction to the belt 2 or, as has been described, by positive entrainment via the teeth and entrainers. In the normal case, however, friction prevails as the force-transmitting basis between the belt and drum.

When, however, friction fails, e.g. as a result of moisture penetrating between the belt and the drum 3, the positive engagement is initiated.

This can be done via a hydraulic cylinder 14 for displacing a friction disk or shoe of a clutch 12 against the free-running ring 7. As a consequence, the ring 7 can no longer rotate relative to the drum 3 and torque is transmitted from the drum 3 to the ring 7 and by the entrainers 5 to the teeth 6 of the belt.

Here as well a bearing 11 is provided which serves to journal the system on the chassis 1 and support the shaft 9. As a consequence the shaft diameter can be relatively small.

The ring 7 is received in a parallel groove of the drum 3 (bearing 15) and the clutch 12 is formed by a clutch disk 13 received in the groove and angularly fixed to the drum 3. When the clutch is actuated, this disk is pressed against a lateral surface of the ring 7. On the opposite side of the ring 7 there is provided a further clutch disk 12 against the blank of the groove of the drum 3 against which a side of the ring 7 and the actuated clutch disk can be returned to their original positions by a disk-type spring 23 providing the restoring force. The set back of the ring 7 when the clutch disengages is similar to that obtained by relaxation by the springs in the earlier embodiment. The hydraulic cylinder 14 can have restoring elements 16 in the form of springs. The working compartments of the hydraulic cylinder or cylinders can be connected via axial and radial passages with the hydraulic medium supply 17 and a distributor 10 supplied thereby.

Figure 4:
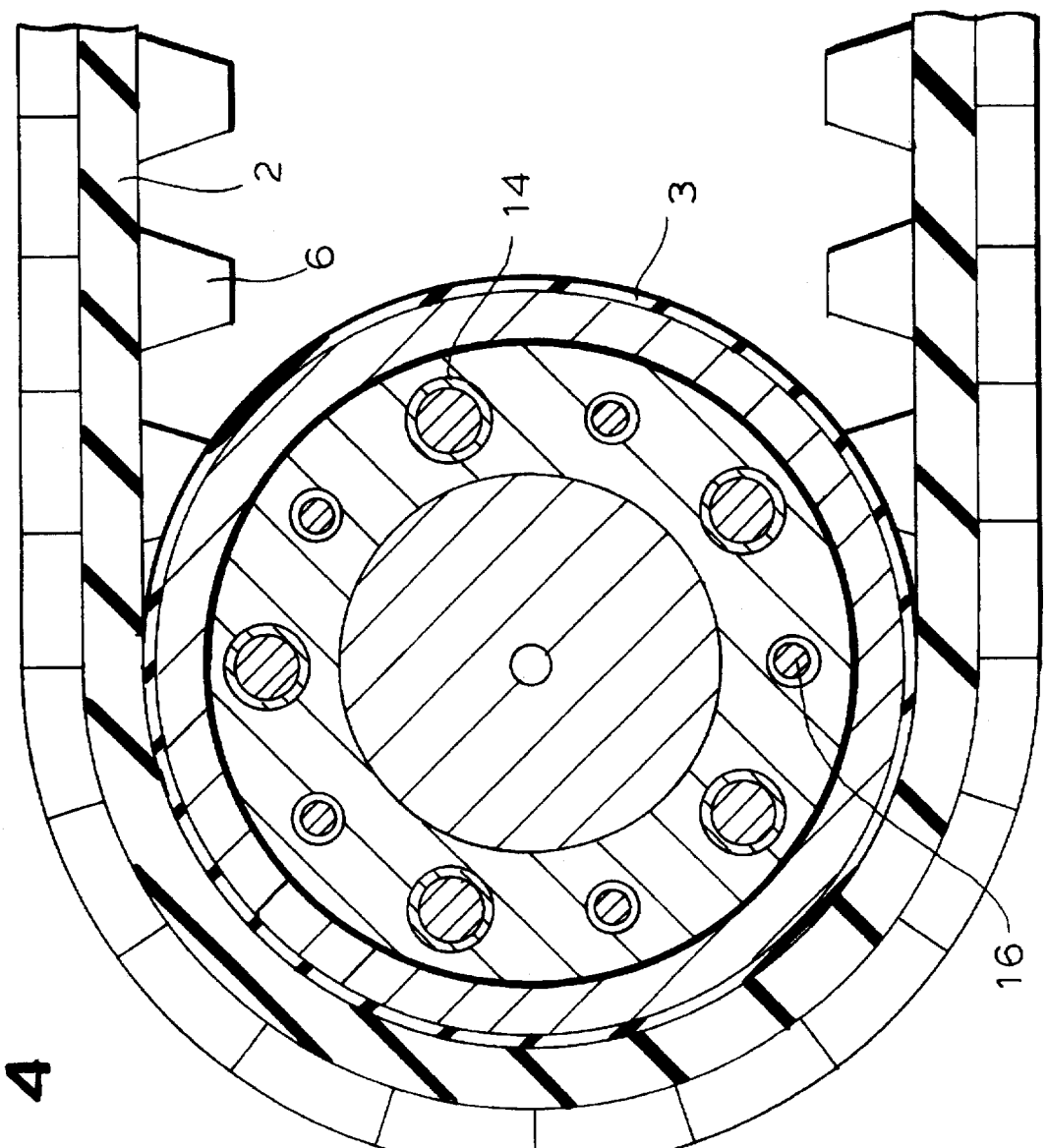
FIG. 4 is a section taken along the line IV—IV of FIG. 3.

As can be seen from FIG. 4, the cylinders 14 and the restoring members 16 may be angularly equispaced from one another and the restoring member 16 may be located midway between the cylinders 14.

Figure 5:
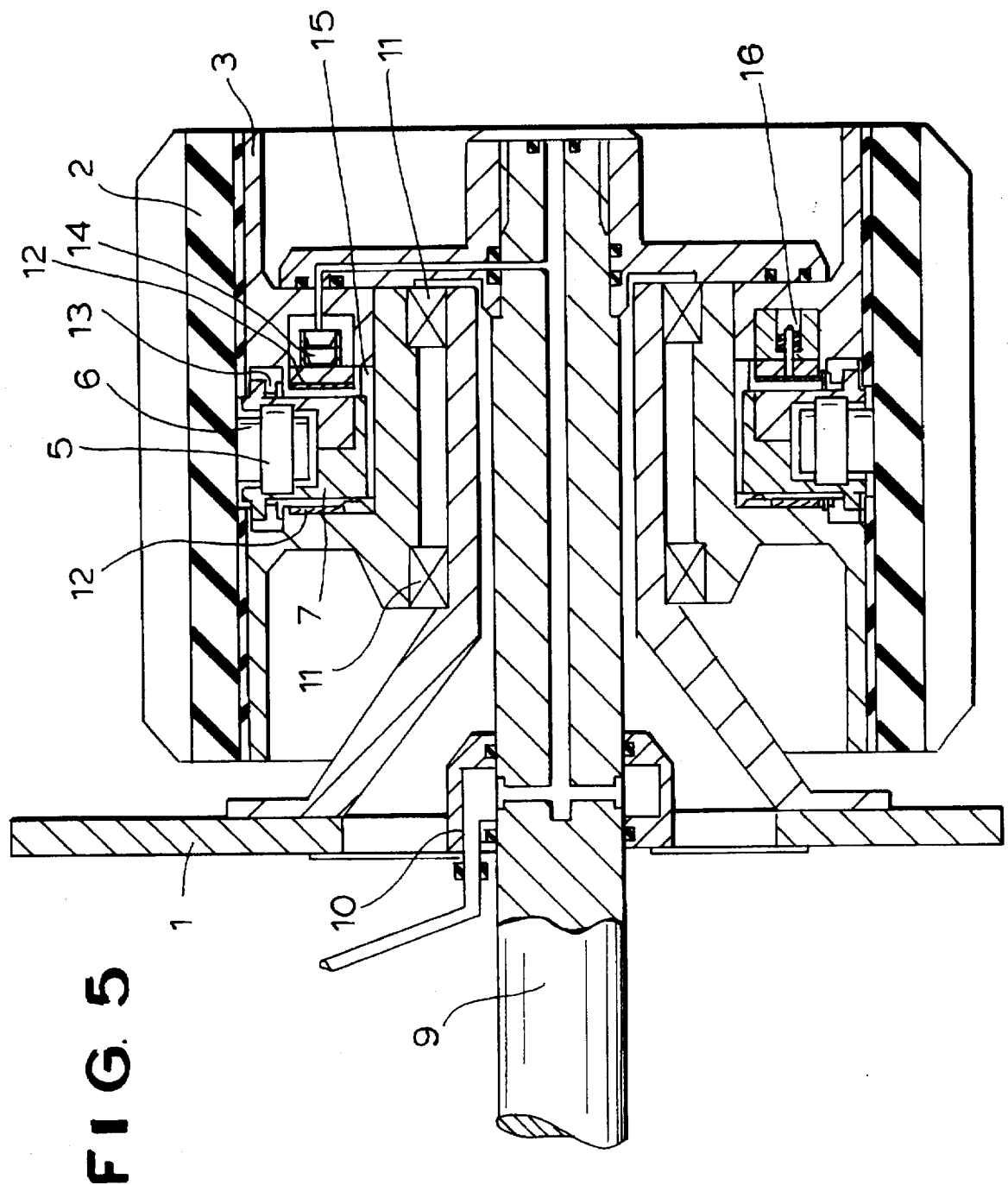
FIG. 5 is a view of another embodiment similar to that of FIG. 3, also in axial cross section.
Figure 6:
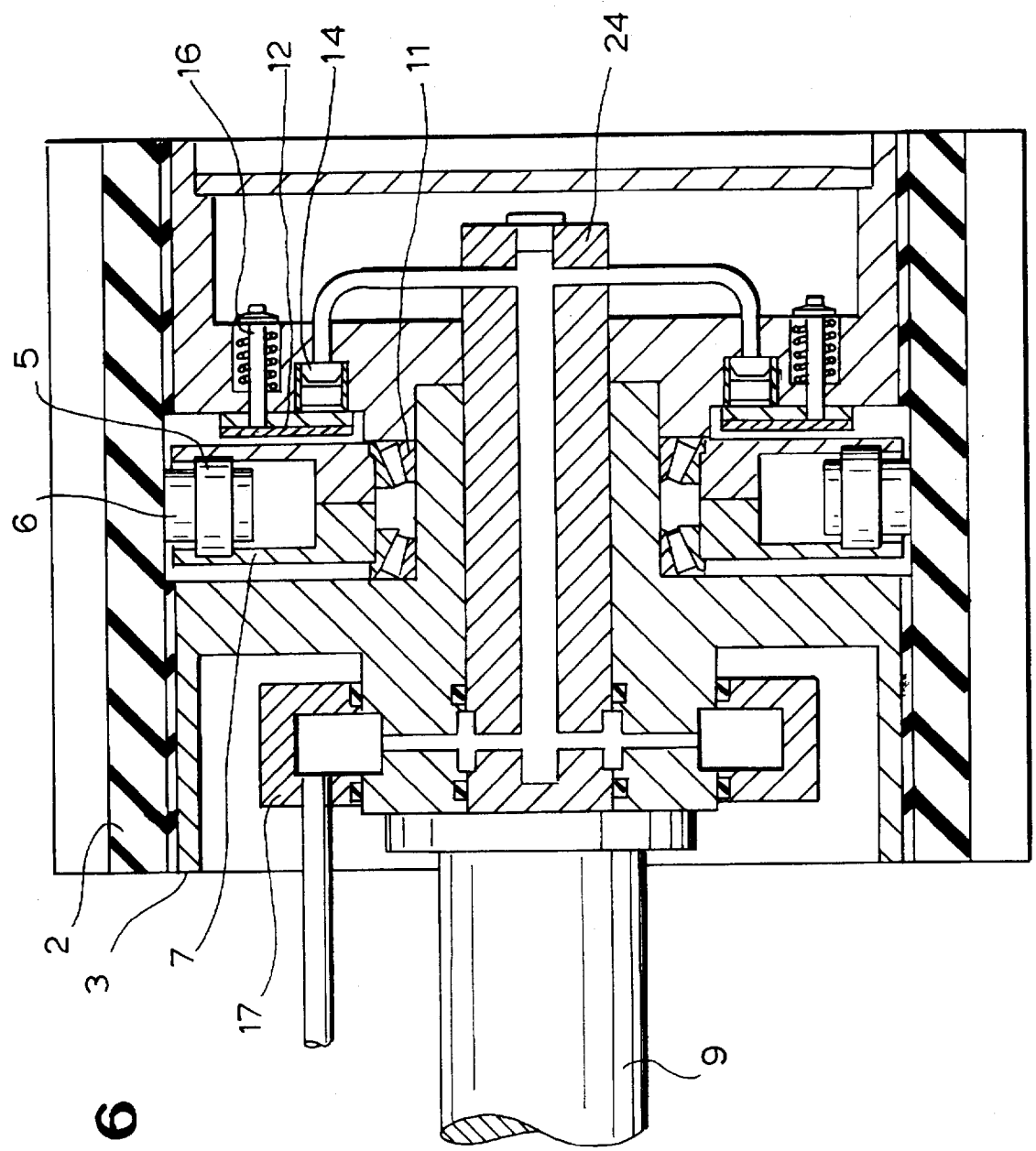
FIG. 6 is a view similar to FIG. 5 showing another embodiment.

A substantially similar construction has been shown in FIG. 5. In FIG. 6 we have shown an embodiment in which the engine power to the shaft 9 is applied to the drum 3 and then to the belt. As long as the friction force between the belt 2 and the drum 3 is sufficient, the ring 7 and its entrainers 5 do not engage the teeth 6 forcibly and the ring 7 is free to rotate on the bearings 11 relative to the drum. In the case in which the belt 2 slips on the drum, the clutch 12 is actuated to fix the ring 7 to the drum. In that case, the driving force is also applied to the ring 7 and the entrainers 5 so that a positive engagement of the entrainers 5 with the teeth 6 of the belt 2 drives the latter. The hydraulic medium is fed to a distributor 17 and then to the rotating drum which has a stub shaft 24 with passages distributing the hydraulic medium to the cylinders 14. The distributor 10 is here not required to rotate although the stub 24 generally rotates with the drum.

The hydraulic cylinders 14 press the clutch 12 against the lateral flanks of ring 7. After relief of the clutch 12, by reduction of the hydraulic medium pressure, the restoring mechanisms 16 retract the clutch 12 from the ring 7.

Figure 7:
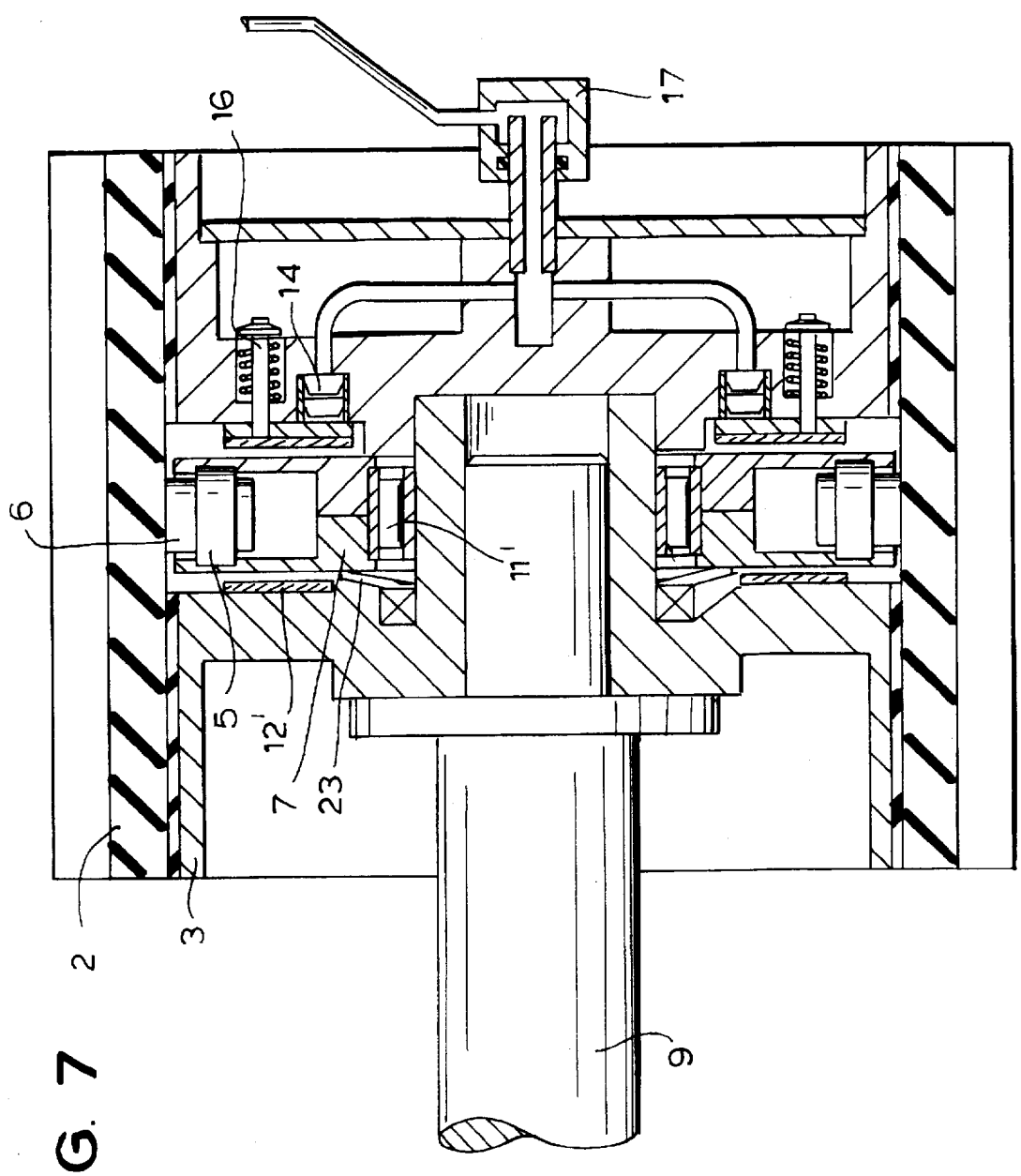
FIG. 7 is an axial cross sectional view of still another embodiment in which a friction clutch is used.

In FIG. 7 a similar embodiment has been illustrated although a different bearing system is shown. The bearing system 11' here uses roller bearings and the roller bearings 11' can allow the ring 7 to shift relative to the drum 3 axially so that a side of the ring 7 opposite that at which the cylinders 14 applied pressure, can engage the friction clutch lining 12' on the opposite flank of the groove of the drum in which the ring 7 is received. A restoring spring 23 serves here also to reposition the ring 7 when the hydraulic medium pressure is relieved.

Figure 8:
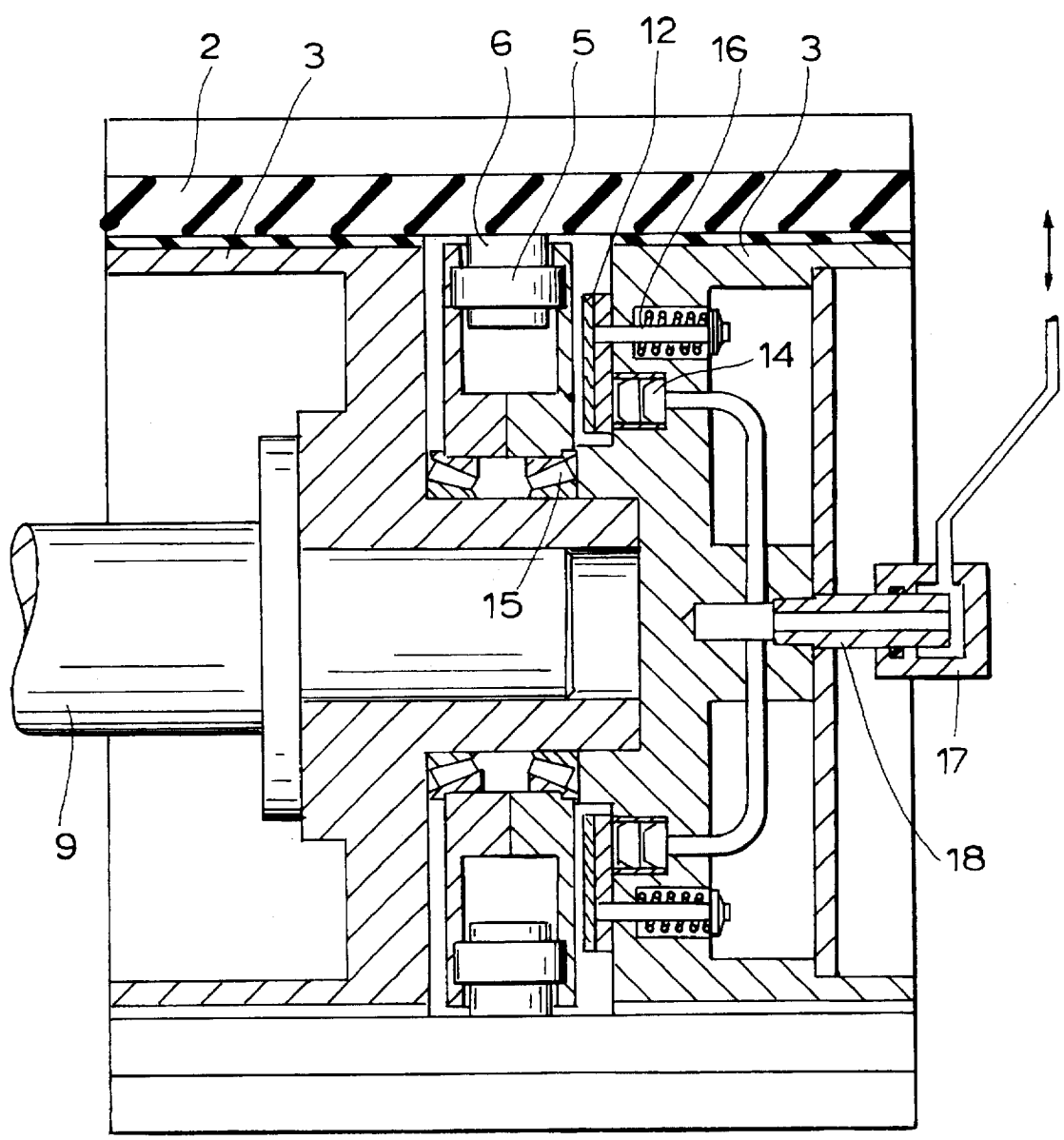
FIG. 8 is a cross sectional view illustrating another variant.

The embodiment of FIG. 8 is similar to that of FIG. 6 but provides a distributor 17 on the side of the drum 3 and into which pipe stub 18 projects opposite that at which the shaft 9 is flanged to the drum.

We claim:

1. A belt drive comprising:
   a belt having an inner surface and a row of inwardly projecting teeth extending along said surface;
   a drive drum around which said belt extends and having an outer periphery frictionally engaged by said surface for frictional drive of said belt by said drum;
   a ring on said drum rotatable relative to said drum and formed with entrainers engageable by said teeth; and
   means between said drum and said ring for impeding displacement of said ring relative to said drum upon slip of said surface of said belt on said drum to effect controlled engagement of said entrainers with said teeth and positive drive of said belt by said drum.

2. The belt drive defined in claim 1 wherein said means between said drum and said ring for impeding displacement of said ring relative to said drum upon slip of said surface of said belt on said drum to effect controlled engagement of said entrainers with said teeth and positive drive of said belt by said drum includes spring elements limiting rotation of said ring relative to said drum and stressed upon relative rotation of the drum and the ring to effect resilient engagement between said entrainers and said teeth for said positive drive of said belt.

3. The belt drive defined in claim 2 wherein said spring elements are affixed to said drum and to said ring.

4. The belt drive defined in claim 3 wherein said ring is journaled in an inner chamber of said drum and said drum has a circumferential slot through which said teeth engage, said entrainers being disposed behind said teeth, said spring elements are disposed in said chamber and have generally elliptical curvatures with ends secured to said drums and eyes midway along said spring elements in which pins connected to said ring engage.

5. The belt drive defined in claim 4 wherein said ring is formed with radial slots, each of said pins being guided in a respective one of said slots.

6. The belt drive defined in claim 1 wherein said means between said drum and said ring for impeding displacement of said ring relative to said drum upon slip of said surface of said belt on said drum to effect controlled engagement of said entrainers with said teeth and positive drive of said belt by said drum includes a clutch actuatable to couple said ring to said drum for joint rotation of said ring and said drum.

7. The belt drive defined in claim 6 wherein said ring is journaled in a circumferential groove of said drum and said clutch comprises a friction disk received in said groove and angularly fixed to said drum, and means for pressing said friction disk against a lateral surface of said ring from one side thereof.

8. The belt drive defined in claim 7 wherein said groove has a clutch disk fixed to a flank of said groove juxtaposed with an opposite side of said ring, whereby said opposite side of said ring is pressed against said clutch disk when said friction disk is pressed against said lateral surface of said ring from said one side thereof.

9. The belt drive defined in claim 8, further comprising a restoring spring acting upon one of said friction disk and said ring in a direction opposite a direction of movement thereof by said means for pressing.

* * * * *